United States Patent
Bonebakker et al.

(10) Patent No.: US 7,707,556 B1
(45) Date of Patent: Apr. 27, 2010

(54) METHOD AND SYSTEM TO MEASURE SYSTEM PERFORMANCE

(75) Inventors: Jan Lodewijk Bonebakker, Livermore, CA (US); Paul A. Riethmuller, Annerley (AU); Robert M. Lane, Dixon, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1228 days.

(21) Appl. No.: 10/953,975

(22) Filed: Sep. 29, 2004

(51) Int. Cl.
G06F 9/44 (2006.01)

(52) U.S. Cl. .................................................. 717/128

(58) Field of Classification Search ......... 717/127–130; 718/100, 103, 102, 108; 714/47, 57; 709/223–224; 710/15, 200
See application file for complete search history.

(56) References Cited

U.S. PATENT DOCUMENTS

| | | | | |
|---|---|---|---|---|
| 5,630,128 A | * | 5/1997 | Farrell et al. | 718/103 |
| 5,752,031 A | * | 5/1998 | Cutler et al. | 718/103 |
| 5,920,689 A | * | 7/1999 | Berry et al. | 714/47 |
| 6,021,425 A | * | 2/2000 | Waldron et al. | 718/103 |
| 7,321,942 B2 | * | 1/2008 | Flautner et al. | 710/15 |
| 7,421,592 B1 | * | 9/2008 | Kadatch et al. | 713/300 |
| 2005/0166206 A1 | * | 7/2005 | Parson | 718/104 |
| 2006/0048148 A1 | * | 3/2006 | Gootherts et al. | 718/100 |

OTHER PUBLICATIONS

Heursh et al, "Steps Towards a Fully Preemptable Linux Kernel", WRTP'03, May 2003, pp. 1-7 (i.e. PreEmptableKernel.pdf).*
Heursch et al, "Preemption concepts, Rhealstone Benchmark and scheduler analysis of Linux 2.4", Real-Time & Embedded Computing Conference, Nov. 2001, pp. 1-12 (i.e. PreemptionConcepts.pdf).*
Sun, "Performance Program Analysis Tool", Forte Developer 7, May 2002, ch. 4-5; i.e. LinuxChp4_5.pdf.*
Sun, <AnalysisToolLinux.pdf> "Performance Program Analysis Tool", Forte Developer 7—Front page and Table of Contents (5 double pages).*

* cited by examiner

*Primary Examiner*—Tuan Anh Vu
(74) *Attorney, Agent, or Firm*—Osha • Liang LLP

(57) ABSTRACT

A method for measuring system performance involves binding a sampling thread to a central processing unit (CPU), starting a soaker thread and binding the soaker thread to the CPU, assigning the soaker thread a lowest priority and scheduling class, placing the soaker thread in a scheduling mechanism based on the lowest priority and scheduling class, and suspending the soaker thread. If a hardware counter is kernel-only, then the following steps are performed: initializing the hardware counters, resuming the soaker thread, and executing the soaker thread if there is no scheduler item of equal or higher priority, where the scheduler item is within the scheduling mechanism.

25 Claims, 3 Drawing Sheets

METHOD AND SYSTEM TO MEASURE SYSTEM PERFORMANCE

The performance of a computer system is often measured by evaluating a workload on the system using performance metrics. Examples of commonly used performance metrics include cycles per instruction (CPI), floating point operations per second (FLOPS), and millions of instructions per second (MIPS). Hardware counters are used to calculate these metrics for a computer system. For a particular computer system, the central processing unit (CPU) may have hardware counters that store data about a given workload. Currently both SPARC™ (Trademark of Sun Microsystems, Inc., Santa Clara, Calif.) and Intel® (Trademark of Intel Corporation, Santa Clara, Calif.) processors offer a set of hardware counters that can be used to study the performance of a workload executing on a CPU. The hardware counters can track many different statistics, e.g., the number of accumulated clock cycles, the number of instructions completed, the number of stalls on a load, etc. The performance metrics can then be calculated by placing the data from the hardware counters into the appropriate formula.

Hardware counters function in basically two modes, user-mode or kernel-mode, reflecting the execution mode of the CPU for that instruction. User programs always run in user-mode, but device drivers and similar low level functions of the operating system run in kernel-mode. When sampling the hardware counters in kernel-mode (for example, the instruction count), the only area of interest is the count resulting from the actual work taking place.

Several software utilities exist to report the statistics kept in the hardware counters. Cputrack and cpustat are both examples of command-line utilities that report on the CPU hardware counters. The cputrack utility only reports the statistics for a single process or application. The cpustat utility, on the other hand, reports the statistics for the entire system.

When performing an analysis using the cpustat utility in kernel mode, the CPU hardware counters keep statistics while each kernel process is run. The cpustat utility samples the hardware counters after a specified interval (either forever or for a specified time limit) and outputs the results to the terminal. If idle time exists during the sampling period (no processes need to be scheduled), then an idle loop runs. The effects of the kernel running the idle loop are included in the sampling. As a result, the measurements of the kernel counters are therefore offset by the idle loop. Specifically, the hardware counters include the processing of the idle loop in the statistics when it should be ignored.

To increase the accuracy of the results of the cpustat utility, a soaker utility (e.g., 'userpeg.5.9' or 'userpeg.5.8') is run parallel to the cpustat utility. The soaker utility runs a low priority thread in user-mode to prevent the kernel idle loop from running. Both of these utility are run as separate programs, each with the necessary overhead to execute its respective thread(s) on the various CPU(s).

SUMMARY OF INVENTION

In general, in one aspect, the invention relates to a method for measuring system performance. The method involves binding a sampling thread to a central processing unit (CPU), starting a soaker thread and binding the soaker thread to the CPU, assigning the soaker thread a lowest priority and scheduling class, placing the soaker thread in a scheduling mechanism based on the lowest priority and scheduling class, and suspending the soaker thread. If a hardware counter is kernel-only, then the following steps are performed: initializing the hardware counters, resuming the soaker thread, and executing the soaker thread if there is no scheduler item of equal or higher priority, wherein the scheduler item is within the scheduling mechanism.

In general, in one aspect, the invention relates to a system for measuring system performance. The system includes a plurality of central processing units (CPUs), comprising a hardware counter, wherein the hardware counter comprises a kernel-only hardware counter; and a modified cpustat utility comprising a soaker thread and a sampling thread. The sampling thread enables the modified cpustat utility to access the hardware counter of the plurality of CPUs. If the hardware counter is a kernel-only hardware counter and if there is no scheduler item of equal or higher priority, then the soaker thread executes.

In general, in one aspect, the invention relates to a computer system for measuring system performance. The computer system includes a processor, a memory, a storage device, a display device, and software instructions stored in the memory for enabling the computer system under control of the processor, to bind a sampling thread to a central processing unit (CPU), start a soaker thread and binding the soaker thread to the CPU, assign the soaker thread a lowest priority and scheduling class, place the soaker thread in a scheduling mechanism based on the lowest priority and scheduling class, and suspend the soaker thread. If a hardware counter is kernel-only, then perform the steps of initializing the hardware counters, resuming the soaker thread, and executing the soaker thread if there is no scheduler item of equal or higher priority, where the scheduler item is within the scheduling mechanism.

Other aspects and advantages of the invention will be apparent from the following description and the appended claims.

DETAILED DESCRIPTION

Figure 1:
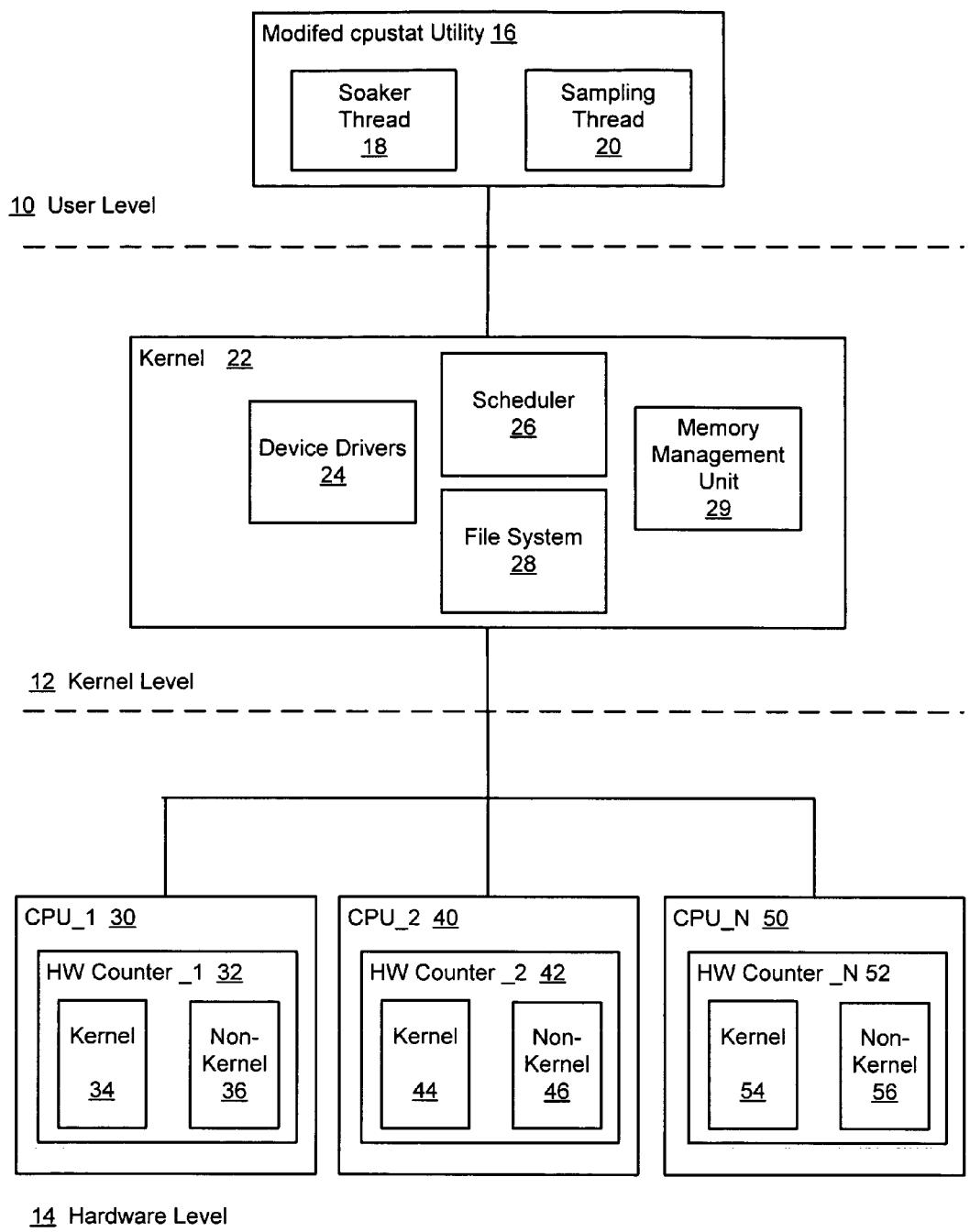
FIG. 1 shows a block diagram of a system to analyze computer system performance in accordance with one or more embodiments of the invention.

Exemplary embodiments of the invention will be described with reference to the accompanying drawings. Like items in the drawings are shown with the same reference numbers. Further, the use of "ST" in the drawings is equivalent to the use of "Step" in the detailed description below.

In an embodiment of the invention, numerous specific details are set forth in order to provide a more thorough understanding of the invention. In other instances, well-known features have not been described in detail to avoid obscuring the invention.

While the discussion below uses the cpustat utility as an example of a utility that takes kernel measurements in the Sun Solaris operating system, the applicability of the method and apparatus described should not be limited to that operating system. The scope of the present invention is broad, it applies to any operating system that executes an idle loop in kernel mode and provides access to the CPU hardware counters.

In general, embodiments of the invention relate to a method and apparatus to include a soaker thread in the cpustat utility and to control the soaker thread when using the cpustat utility. More specifically, embodiments of the invention relate to taking a kernel measurement using the cpustat utility while allowing the soaker thread to continue, and when the kernel measurement is finished the cpustat utility suspends the soaker thread.

FIG. 1 shows a block diagram of a system to analyze computer system performance in accordance with one or more embodiments of the invention. In one embodiment of the invention, the system has three separate levels of operation: the user level (10), the kernel level (12), and the hardware level (14).

In the user level (10), a specific application's instructions are executed in user mode by the CPU. Generally, this sort of application is the most familiar to the user, because the user is the one that initiates the execution of the application (either through a command line interface or accessing the program using a graphical user interface). Examples of programs executed in user level include the two system performance utilities cpustat utility and the soaker utility that are described above.

In one embodiment of the invention, both the functionality of the cpustat utility and the soaker utility may be combined in a single utility referred to as the modified cpustat utility (16). The modified cpustat utility (16) is an application that includes both a soaker thread (18) and a sampling thread (20) to improve the accuracy of the cpustat utility, while avoiding running the cpustat utility and the soaker utility in separate processes. The sampling thread (20) of the modified cpustat utility (16) provides access to the hardware counters (HW Counter_1 (32), HW Counter_2 (42), HW Counter_N (52)) and obtain data about the respective CPUs (CPU_1 (30), CPU_2 (40), CPU_N (50)). As discussed above, the soaker thread (18) is used to avoid the idle loop and obtain more accurate data from the respective CPUs (CPU_1 (30), CPU_2 (40), CPU_N (50)).

At the kernel level (12), various components (that are typically less common to the user) are executed to allow the user level applications to interact with the hardware level (14) and allow proper performance of user level applications and the operating system as a whole. Examples of these components include device drivers (24), a scheduler (26), a file system (28), a memory management unit ("MMU") (29), etc.

Device drivers (24) integrate a specific device with the operating system and essentially converts the more general input/output instructions of the operating system to messages that the device type can understand. The scheduler (26) is a program within the operating system that manages the scheduling of CPU time between multiple processes. The scheduler (26) schedules a process to run until it voluntarily gives up the CPU or until a specified time limit expires. The scheduler (26) also chooses the next process (usually the one that has the highest priority at that point) to run on a particular CPU. The file system (28) establishes a framework for the voluminous files being created, accessed, and/or deleted by the operating system. The MMU (29) is responsible for handling memory accesses requested by the CPU. Among the functions of the MMU (29) are the translation of virtual addresses to physical addresses (i.e., virtual memory management), memory protection, cache control, bus arbitration, etc. One skilled in the art will appreciate that the kernel components described may vary depending on the particular operating system being discussed or the type of system architecture. The descriptions of the components are not intended to limit the invention or the scope of these terms as used in this patent application.

In one embodiment of the invention, the hardware level (14) executes the instructions generated by the programs run at the user level (10) and kernel level (12). CPUs (CPU_1 (30), CPU_2 (40), CPU_N (50)) process these instructions and may keep statistics about the processes using hardware counters (HW Counter_1 (32), HW Counter_2 (42), HW Counter_N (52)). In one embodiment of the invention, two different types of hardware counters (HW Counter_1 (32), HW Counter_2 (42), HW Counter_N (52)) exist, namely kernel counters (34, 44, 54) and non-kernel counters (36, 46, 56). The kernel counters (34, 44, 54) keep statistics about the kernel level applications that are processed by the respective CPUs (CPU_1 (30), CPU_2 (40), CPU_N (50)). The non-kernel counters (36, 46, 56) keep the statistics about the user level applications that are processed by the respective CPUs (CPU_(30), CPU_2 (40), CPU_N (50)). One skilled in the art will appreciate that while a specific type and arrangement of the hardware level is described above, any number of CPUs, hardware counters, and types of hardware counter may exist. Further, any arrangement of hardware counters on the CPU's and the types of hardware counters on a specific CPU may vary depending on the particular system architecture or purpose of the hardware.

Figure 2:
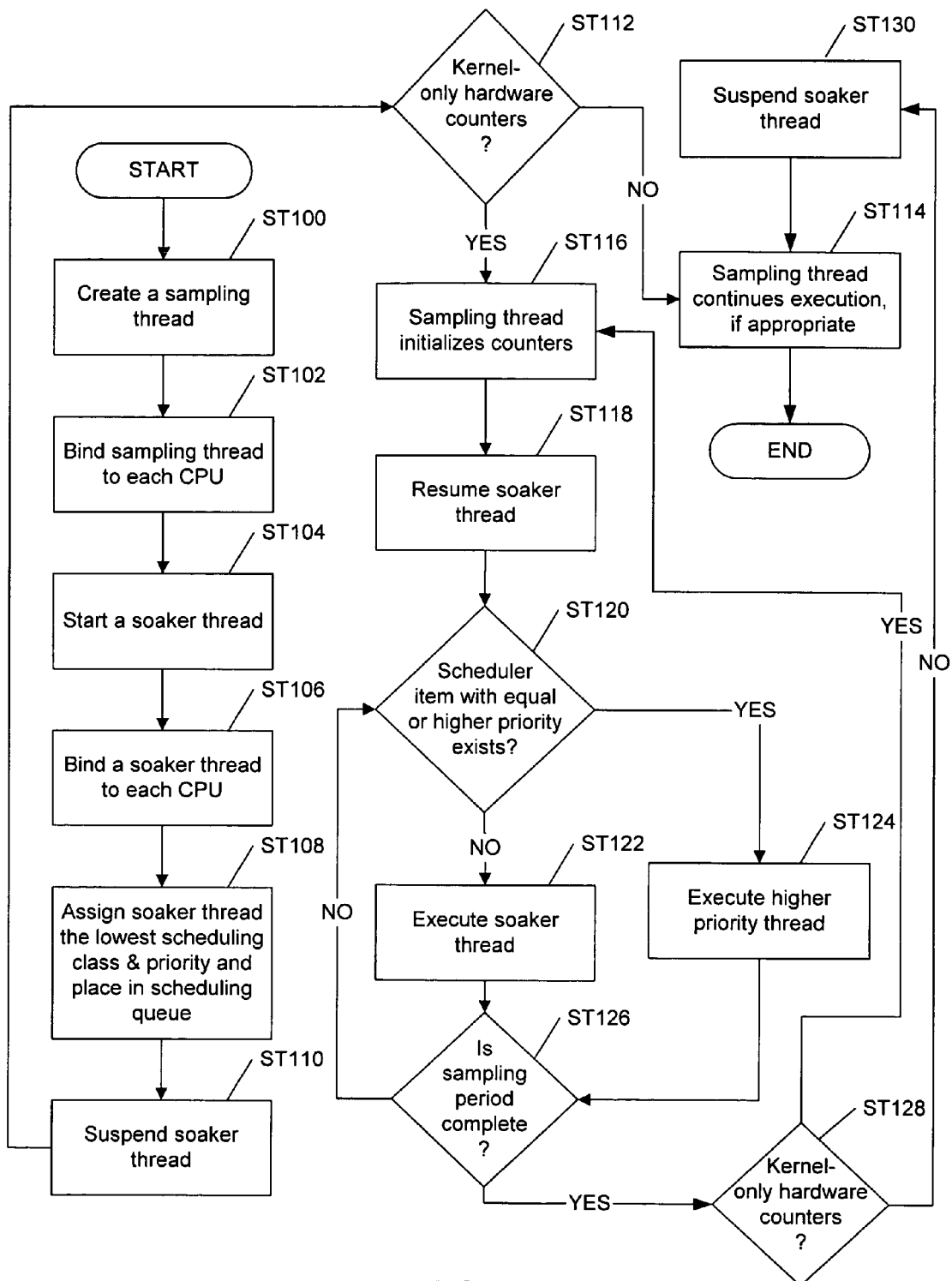
FIG. 2 shows a flowchart of the operation of a modified cpustat including soaker functionality in accordance with one or more embodiments of the invention.

FIG. 2 shows a flowchart of the operation of a modified cpustat utility, including soaker functionality in accordance with one or more embodiments of the invention. The flowchart described below is a single pass of the operation of the cpustat utility and does not intend to show the complete operation of the modified cpustat. One skilled in the art will appreciate that the process described below may be continuous and that processes in an active computer system do not typically end after a single iteration of a process.

Initially, the modified cpustat utility creates a sampling thread during startup (Step 100). Next, the modified cpustat utility binds this sampling thread to each CPU (Step 102). In one embodiment of the invention, a soaker thread is also started (Step 104) and the soaker thread is bound to the same CPU (Step 106). The CPU with a sampling thread and soaker thread now enables accurate measurement of the hardware counters within the CPU using the modified cpustat utility. One skilled in the art will appreciate that the cpustat utility may bind sampling threads and corresponding soaker threads to numerous CPUs. Accordingly, the hardware counters within each of these CPUs may be readable by the modified cpustat utility. Further, one skilled in the art will appreciate that little performance cost is related to the signaling of the soaker thread as well as a very low cost related to the creation of a soaker thread.

Next, this soaker thread is assigned the lowest priority scheduling class with the lowest priority value and placed in the scheduling mechanism, such as a scheduling queue (Step 108). This placement in the queue at the lowest class and value basically guarantees that every other process runs before the soaker thread, but that the soaker thread runs before the idle loop. In one embodiment of the invention, as soon as the soaker thread has started running, it is suspended (Step 110).

Subsequently, a determination is made whether the hardware counters are kernel-only counters (Step 112). If the hardware counters are kernel-only counters, then the sampling thread initializes the counters for the upcoming sampling (Step 116) and the sampling thread signals the soaker thread to resume (Step 118). If the hardware counters are not kernel-only counters, the sampling thread continues execution in the typical manner (Step 114).

Once the soaker thread has been signaled to resume, the operating system scheduler takes the placement of the soaker thread in the scheduling queue into consideration and will execute it before the idle loop. Specifically, the operating system scheduler determines whether a scheduler item (i.e., the item at the head of the scheduling queue) with equal or higher priority exists (Step 120). If so, then the equal or higher priority thread is executed (Step 124). Otherwise, the soaker thread is executed (Step 122). One skilled in the art will appreciate that while in this embodiment of the invention, the scheduler uses a scheduling queue for the data structure, any sort of data structure may be used by a particular scheduler depending on the particular operating system and system configurations.

Next, a determination is made whether the sampling period is complete (Step 126). If the sampling period is not complete, then the process returns to Step 120. Otherwise, when the sampling period ends and the next set of counters are not kernel counters (128), the sampling thread signals the soaker to suspend (130) and the sampling thread continue execution in the typical manner (Step 114). If the hardware counters are kernel-only and the sampling period is complete, then the process resumes at Step 116. One skilled in the art can appreciate that during the process described in FIG. 2, statistics are being generated by the hardware counters and collected by the sampling thread of the cpustat utility described in FIG. 1. Such statistics may be displayed in a variety of forms, including graphical, tabular, and using known UNIX system utilities, such as perl, nawk, etc.

In one embodiment of the invention, an example of the command line instruction for the cpustat utility may appear as follows:
cpustat -s \
-c pic0=Instr_cnt,pic1=Cycle_cnt \
-c pic0=Instr_cnt,pic1=Cycle_cnt,sys \
-c pic0=Instr_cnt,pic1=Cycle_cnt,sys,nouser \
1 16

The cpustat utility shown above runs the cpustat utility for 16, one second measurement intervals and then exits. Cpustat cycles through each of the "pics" (i.e., hardware counter reference points to evaluate statistics) defined in the above command line instruction until it exits. The use of the command line option "-s" activates the built in kernel soaker in the cpustat utility. The purpose of the soaker is to prevent the idle loop from running while the cpustat utility is taking kernel statistics. As described above, the tight execution footprint of the idle loop greatly influences the kernel statistics. Therefore, removal of the idle loop allows the acquisition of stable statistics from systems with fluctuating workloads.

In one embodiment of the invention and as described above in FIG. 2, the "-s option" activates a soaker thread at startup of the cpustat utility. This thread is blocked on a mutex (i.e., using a mutual exclusion command) until the cpustat utility encounters a pic that is in kernel context. Only in this case, are the mutex released and the soaker thread resumed. By using the mutex, the soaker thread may be run but stays in the scheduling queue when the CPU is used by higher priority scheduler items.

In one embodiment of the invention, system performance counters are the primary research tool into the behavior of workloads on computer systems. Thus, reliable data is an important need for the ongoing design-improve-review product life cycle. With accurate counter data, the designers of computer systems have reliable data to use for their models and make the correct design decisions. In one embodiment of the invention, the present invention improves the accuracy of the cpustat utility by avoiding running the cpustat utility and the soaker utility in separate processes. Therefore, the system overhead from the frequent starting and stopping of the soaker utility and the starting and stopping of the cpustat utility is reduced and its effect on perturbing the system and the data being measured removed. Further, in one embodiment of the invention, the effect of the idle loop interfering with the accuracy of the data while the cpustat utility is taking kernel statistics has been prevented.

Figure 3:
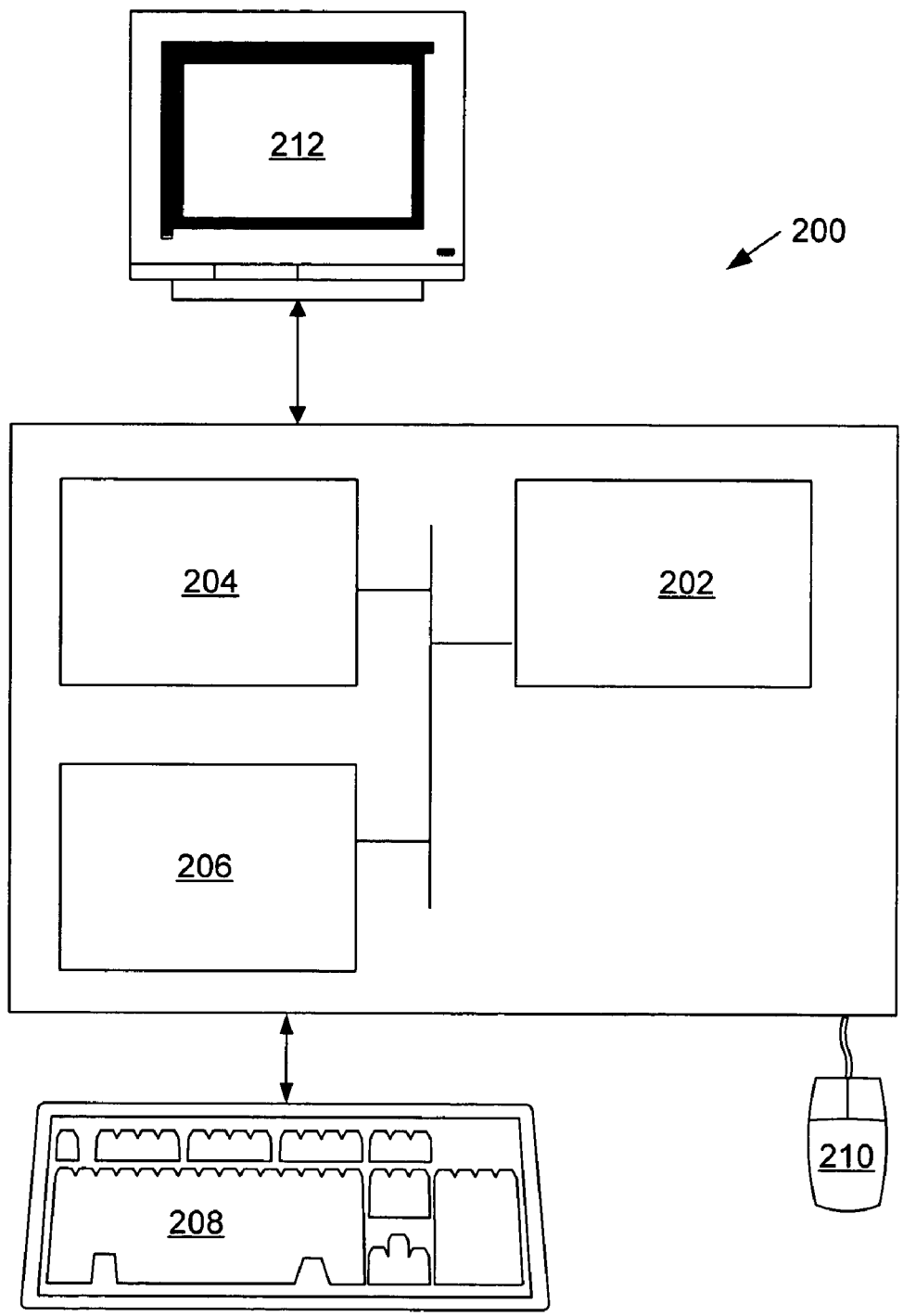
FIG. 3 shows a typical networked computer system in accordance with one or more embodiments of the invention.

The invention may be implemented on virtually any type of computer regardless of the platform being used. For example, as shown in FIG. 3, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (200) may be located at a remote location and connected to the other elements over a network.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for measuring system performance using a soaker thread of a software utility application, wherein the soaker thread prevents execution of an idle loop during a sampling period, wherein the idle loop is a default process that executes only when there are no other processes requiring execution, and wherein execution the idle loop interferes with an accuracy of a statistic tracked by a hardware kernel counter during the sampling period, the method comprising:

binding a sampling thread of the software utility application to a processor comprising the hardware kernel counter;

starting the soaker thread of the software utility application, binding the soaker thread to the processor, and assigning the soaker thread a first priority;

signaling, using the sampling thread, the soaker thread to suspend;

initializing the hardware kernel counter for the sampling period using the sampling thread;

signaling, using the sampling thread, the soaker thread to resume after initializing the hardware kernel counter;

executing the soaker thread during the sampling period to avoid execution of the idle loop, wherein the soaker thread executes before the idle loop, and wherein executing the soaker thread prevents execution of the idle loop;

interrupting execution of the soaker thread to execute an operating system thread during the sampling period, wherein the operating system thread comprises a second priority exceeding the first priority, and wherein the hardware kernel counter tracks the statistic corresponding to at least the execution of the operating system thread;

executing the soaker thread after execution of the operating system thread is complete to avoid execution of the idle loop, wherein execution of the idle loop offsets the statistic tracked by the hardware kernel counter, and wherein the operating system thread completes execution prior to completion of the sampling period;

collecting, using the sampling thread, the statistic tracked by the hardware kernel counter; and suspending the soaker thread after completion of the sampling period by signaling the soaker thread using the sampling thread.

2. The method of claim 1, further comprising:
creating the sampling thread using a utility program, wherein the utility program comprises the soaker thread.

3. The method of claim 2, further comprising:
accessing the utility program using a command line interface.

4. The method of claim 1, further comprising:
placing the soaker thread in a scheduling mechanism.

5. The method of claim 4, wherein the scheduling mechanism is a queue.

6. The method of claim 5, further comprising:
positioning the soaker thread in the queue based on the first priority.

7. The method of claim 1, wherein the soaker thread is suspended using a mutex command.

8. The method of claim 1, wherein execution of the operating system thread increments the hardware kernel counter.

9. The method of claim 1, wherein collecting the statistic is executed prior to signaling the soaker thread to suspend after completion of the sampling period.

10. The method of claim 1, wherein the statistic comprises a number of cycles per instruction of the operation system thread.

11. A computer system for measuring system performance using a soaker thread of a software utility application, wherein the soaker thread prevents execution of an idle loop during a sampling period, wherein the idle loop is a default process that executes only when there are no other processes requiring execution, and wherein execution the idle loop interferes with an accuracy of a statistic tracked by a hardware kernel counter during the sampling period, the system comprising:

a processor comprising the hardware kernel counter; and a memory storing the software utility application comprising functionality to:

bind a sampling thread of the software utility application to the processor;

start the soaker thread of the software utility application, bind the soaker thread to the processor, and assign the soaker thread a first priority;

signal, using the sampling thread, the soaker thread to suspend;

initialize the hardware kernel counter for the sampling period using the sampling thread;

signal, using the sampling thread, the soaker thread to resume after initializing the hardware kernel counter;

execute the soaker thread during the sampling period to avoid execution of the idle loop, wherein the soaker thread executes before the idle loop, and wherein executing the soaker thread prevents execution of the idle loop;

interrupt execution of the soaker thread to execute an operating system thread during the sampling period, wherein the operating system thread comprises a second priority exceeding the first priority, and wherein the hardware kernel counter tracks the statistic corresponding to at least the execution of the operating system thread;

execute the soaker thread after execution of the operating system thread is complete to avoid execution of the idle loop, wherein execution of the idle loop offsets the statistic tracked by the hardware kernel counter, and wherein the operating system thread completes execution prior to completion of the sampling period;

collect, using the sampling thread, the statistic tracked by the hardware kernel counter; and suspend the soaker thread after completion of the sampling period by signaling the soaker thread using the sampling thread.

12. The computer system of claim 11, the instructions further comprising functionality to:
create the sampling thread using a utility program, wherein the utility program comprises the soaker thread.

13. The computer system of claim 12, the instructions further comprising functionality to:
access the utility program using a command line interface.

14. The computer system of claim 11, the instructions further comprising functionality to:
display the statistic.

15. The computer system of claim 11, the instructions further comprising functionality to:
place the soaker thread in a scheduling mechanism.

16. The computer system of claim 15, wherein the scheduling mechanism is a queue.

17. The computer system of claim 16, the instructions further comprising functionality to:
position the soaker thread in the queue based on the first priority.

18. The computer system of claim 11, wherein execution of the operating system thread increments the hardware kernel counter.

19. The computer system of claim 11, wherein the statistic comprises a number of cycles per instruction of the operating system thread.

20. A system for measuring system performance using a soaker thread of a software utility application, wherein the soaker thread prevents execution of an idle loop during a sampling period, wherein the idle loop is a default process that executes only when there are no other processes requiring execution, and wherein execution the idle loop interferes with an accuracy of a statistic tracked by a hardware kernel counter during the sampling period, the system comprising:

a processor comprising the hardware kernel counter configured to track the statistic, wherein the soaker thread comprises a first priority and is bound to the processor, wherein the soaker thread is executed to avoid execution of the idle loop, wherein the soaker thread executes before the idle loop, and wherein executing the soaker thread prevents execution of the idle loop;

a sampling thread of the software utility application configured to:

initialize the hardware kernel counter prior to the sampling period;

signal the soaker thread to resume after initializing the hardware kernel counter;

collect the statistic tracked by the hardware kernel counter after completion of the sampling period; and suspend the soaker thread after completion of the sampling period by signaling the soaker thread, wherein the sampling thread is bound to the processor; and an operating system thread comprising a second priority exceeding the first priority, wherein execution of the soaker thread is interrupted to execute the operating system thread during the sampling period, wherein the hardware kernel counter tracks the statistic corresponding to at least the execution of the operating system thread, and wherein execution of the idle loop offsets the statistic tracked by the hardware kernel counter.

21. The system of claim 20, further comprising:
a utility program comprising the soaker thread and configured to create the sampling thread.

22. The system of claim 21, further comprising:
a command line interface to access the utility program.

23. The system of claim 20, further comprising a scheduling mechanism storing the soaker thread and the operating system thread.

24. The system of claim 23, wherein the scheduling mechanism is a queue.

25. The system of claim 20, wherein the statistic comprises a number of cycles per instruction of the operating system thread.

* * * * *

UNITED STATES PATENT AND TRADEMARK OFFICE
CERTIFICATE OF CORRECTION

PATENT NO. : 7,707,556 B1
APPLICATION NO. : 10/953975
DATED : April 27, 2010
INVENTOR(S) : Jan Lodewijk Bonebakker et al.

It is certified that error appears in the above-identified patent and that said Letters Patent is hereby corrected as shown below:

Title page, Item (56), in column 2, under "Other Publications", line 1, delete "Heursh" and insert -- Heursch --, therefor.

In the Drawings, on sheet 1 of 3, in Figure 1, line 1, reference numeral "16" delete "Modifed" and insert -- Modified --, therefor.

In column 1, line 3, below "SYSTEM PERFORMANCE" insert -- BACKGROUND --.

In column 4, line 16, delete "CPU_(30)," and insert -- CPU_1 (30), --, therefor.

In column 7, line 29, in claim 10, delete "operation" and insert -- operating --, therefor.

Signed and Sealed this
Nineteenth Day of April, 2011

David J. Kappos
*Director of the United States Patent and Trademark Office*